US012780992B2

(12) United States Patent
Lu et al.

(10) Patent No.: US 12,780,992 B2
(45) Date of Patent: Nov. 3, 2026

(54) TEMPORARY HIGH-TEMPERATURE-RESISTANT DISPERSING AGENT AND PREPARATION AND USE METHOD THEREOF

(71) Applicant: SHANDONG UNIVERSITY, Jinan (CN)

(72) Inventors: Haifeng Lu, Jinan (CN); Chuanjian Zhou, Jinan (CN); Shengyu Feng, Jinan (CN); Hua Wang, Jinan (CN); Chen An, Jinan (CN); Yuan Qu, Jinan (CN); Fanzhen Kong, Jinan (CN); Qingming Zeng, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 680 days.

(21) Appl. No.: 18/266,270

(22) PCT Filed: Jul. 28, 2021

(86) PCT No.: PCT/CN2021/108792
§ 371 (c)(1),
(2) Date: Jun. 8, 2023

(87) PCT Pub. No.: WO2022/121327
PCT Pub. Date: Jun. 16, 2022

(65) Prior Publication Data

US 2024/0034842 A1 Feb. 1, 2024

(30) Foreign Application Priority Data

Dec. 9, 2020 (CN) ........................ 202011424818.8

(51) Int. Cl.
*C08G 14/06* (2006.01)
*C08G 14/14* (2006.01)
*C08G 77/452* (2006.01)
*C08G 77/48* (2006.01)
*C09K 23/54* (2022.01)

(52) U.S. Cl.
CPC ........... *C08G 77/452* (2013.01); *C08G 14/06* (2013.01); *C08G 14/14* (2013.01); *C08G 77/48* (2013.01); *C09K 23/54* (2022.01)

(58) Field of Classification Search
CPC ..................................................... C08G 14/06
See application file for complete search history.

(56) References Cited

U.S. PATENT DOCUMENTS

| | | | | |
|---|---|---|---|---|
| 5,543,516 A | | 8/1996 | Ishida | |
| 2009/0192282 A1 | * | 7/2009 | Janvikul | C08J 3/243 556/460 |

FOREIGN PATENT DOCUMENTS

| | | | | | |
|---|---|---|---|---|---|
| CN | 101585917 A | | 11/2009 | |
| CN | 102584884 A | | 7/2012 | |
| CN | 107629082 A | | 1/2018 | |
| CN | 107629182 A | | 1/2018 | |
| CN | 108164708 A | * | 6/2018 | C09K 11/06 |
| CN | 108546272 A | * | 9/2018 | C07F 7/1892 |
| CN | 109054734 A | | 12/2018 | |
| CN | 107629182 B | * | 10/2019 | |
| CN | 110964202 A | | 4/2020 | |
| CN | 111848959 A | | 10/2020 | |
| JP | 20140701723 | * | 4/2014 | |

OTHER PUBLICATIONS

Machine translation of CN 107629182 (No. date).*
Machine translation of CN 108164708 (No. date).*
"Morphology and Thermomehcanical Properties of Main-chain Polybenzoxazine-block-Polydimethylsiloxane Multiblock Copolymers" authored by Wang et al. and published in Polymer (2010) 51, 1124-1132.*
"Synthesis and Characterization of a Hybrid Material Based on a Trimethoxysilane-functionalized Benzoxazine" authored by Sponton et al., and published in the Journal of Applied Polymer Science, (2012) 126, 1369-1376.*
"Dynamic Mechanical and Shape Memory Properties of Polybenzoxazines based on Aminopropyl-terminated Siloxanes" authored by Su et al. and published in the Journal of Applied Polymer Science (2016) 44121/ 1-9.*
"Preparation of High Molecular Weight Polybenzoxazine Prepolymers Containing Siloxane Units and Properties of their Thermosets" authored by Takeichi et al. and published in Journal of Polymer Science, Part A: Polymer Chemistry (2010) 48, 4945-5952.*
Machine translation of CN 107522931 (no date).*
Machine translation of CN 108546272 (no date).*
International Search Report of PCT Patent Application No. PCT/CN2021/108792 issued on Oct. 25, 2021.

* cited by examiner

*Primary Examiner* — Marc S Zimmer

(57) ABSTRACT

A temporary high-temperature-resistant dispersing agent, and a preparation and a use method thereof. The temporary high-temperature-resistant dispersing agent is a block high-molecular polymer prepared by a one-step reaction from polysiloxane containing an amino group. The prepared block high-molecular polymer may be directly used as a dispersant; the block high-molecular polymer may also be used as a basic formula and used as the dispersant after other auxiliary compositions are added; and the block high-molecular polymer may also be used in combination with one or more other dispersion auxiliaries and/or surfactants to meet dispersion requirements in various special occasions.

14 Claims, 3 Drawing Sheets

TEMPORARY HIGH-TEMPERATURE-RESISTANT DISPERSING AGENT AND PREPARATION AND USE METHOD THEREOF

FIELD

The present disclosure relates to a temporary high-temperature-resistant dispersing agent and a preparation and use method thereof, and belongs to the field of polymer material preparation and application.

BACKGROUND

A dispersant refers to an auxiliary that can enhance and improve the dispersion performance of solid or liquid materials. During grinding of solid dyes, adding the dispersant is contributed to particle crushing and preventing agglomeration of crushed particles to maintain stability of a dispersion system. The dispersant may uniformly disperse those inorganic and organic solid and liquid particles which are difficult to dissolve in liquid, and meanwhile may also prevent sedimentation and agglomeration of the particles, forming an amphiphilic reagent needed for a stable suspension. The dispersant plays a role of using a wetting dispersant to reduce time and energy needed to complete a dispersion process, stabilize a dispersed dispersion, adjust moveability of the particles, improve the luster, and increase a leveling effect. The types of the dispersant include anionic, cationic, nonionic, amphoteric, polymer types, etc.

Polymer dispersants have a maleic anhydride copolymer, a polyacrylic acid derivative, polycarboxylate, a nonionic water-soluble polymer (polyvinylpyrrolidone, a polyether derivative and polyethylene glycol), etc. Paraffin dispersants are external lubricants, are non-polar linear hydrocarbons, and cannot wet a metal surface, that is, the paraffin dispersants cannot prevent polyvinyl chloride and other resin from sticking to a metal wall, and only when the paraffin dispersants are used with stearic acid, calcium stearate, etc., can a synergistic effect be played. Low molecular wax is a series of different-performance low polymers formed through pyrolysis and oxidation by taking a variety of polyethylene (homopolymers or copolymers), polypropylene, polystyrene or other polymer modifiers as raw materials. Its main products have five kinds: homopolymers, oxidized homopolymers, ethylene-acrylic acid copolymers, ethylene-vinyl acetate copolymers and low molecular ionomers. The polyethylene wax is the most common, with average molecular mass of 1500-4000 and a softening point of 102° C. The average molecular mass of polyethylene wax of other specifications is 10000-20000, and a softening point is 106° C. Long-chain molecules of oxidized polyethylene wax carry a certain amount of ester groups or soap bases, so internal and external lubrication effects on PVC, PE, PP and ABS are more balanced, the effect is better, and its transparency is good. Because of the variety of dispersant kinds and practical application environments, it is very important to choose the appropriate dispersant.

A main effect of the polymer dispersants is a steric hindrance effect of a physical adsorption film on its surface. The thickness of the adsorption film of the polymer dispersants is very large, generally up to tens of nanometers, which is greater than the thickness of an electric double layer, so it can show its dispersion effect when materials are far apart, and the separation and gathering effect of the polymer dispersants may be mutually converted. According to a first principle of dispersion regulation, a large number of polar groups are distributed on an organic polymer chain, so the dense adsorption of organic molecules on the material surface will make the particle surface hydrophilic, which will enhance the particle surface lubricity to polarity. All of these properties are conducive to the dispersion of object particles.

Disperse-AYD series dispersants produced by Daniel Products, an American company, are a mixture of several surfactants, which can stabilize a dispersion system after coating, have good compatibility with different solvents, and ensure long-term viscosity stability. AYD-15 is composed of modified thermoplastic polypropylene resin, acrylic resin and a propylene glycol monomethyl ether acid solution, which is mainly suitable for preparation of pigment dispersion with a high concentration, and can be directly synthesized into final solvent based coating. A pigment dispersion system prepared from AYD-15 has good compatibility with various alkyd resin (long oil and medium oil), and can be used to prepare products with air self-drying, uniform color and good durability and chemical stability. DISPER BYK-163 launched by BYK Chemie is composed of polymer block copolymers, which have a strong adsorption effect on pigment surfaces, significantly improve a wetting effect on pigment particles, shorten a grinding process, and increase the output per unit time. The EFKA chemical company of the Netherlands has launched dispersants for printing ink and coating industries. EFKAN-5044/5244 is a dispersing and wetting agent suitable for a coating system with or without a solvent, especially for the preparation of bentonite colloids. EFKA-5064/5066 has good compatibility performance with a variety of resin (alcohol acid, amino resin, nitrocellulose, poly allylamine, etc.), is an efficient wetting dispersant, and can prevent the coating system from producing a floating phenomenon. In addition, there are also Elvacite polymer dispersants launched by the DuPont company in the United States, Hypersol hyperdispersants launched by the KVK company in Denmark, Solsperse Hyperdispersants launched by the ICI company in the United Kingdom, CH series hyperdispersants launched by the Shanghai Sanzheng polymer material company and other polymer dispersant commodities.

The above polymer dispersant commodities can effectively solve the dispersion problem at a room temperature, so as to be widely applied. But temperature resistance of these polymer dispersant commodities is not high. For example, the decomposition temperature of polyacrylamide is 210° C.; and the decomposition temperature of polymethacrylic acid resin is 170° C., and the upper limit of temperature resistance of alkyd resin paint is 120° C. Therefore, these polymer dispersant commodities above cannot meet application needs of dispersion at a high temperature. The high-temperature resistant polymer dispersant has good high temperature resistant performance, and can provide dispersion and conveying of powder materials at the high temperature. In many cases, the dispersants often need to be removed after dispersing and conveying the powder materials to reduce the effect of the dispersants on the material properties. A convenient way to remove the dispersants is to decompose the dispersants at a higher temperature. Therefore, a demand for the high-temperature resistant polymer dispersants with low mass of residual char at the higher temperature is produced. A temporary high-temperature-resistant dispersing agent product is still a blank and needs to be researched and developed urgently.

SUMMARY

In view of the current situation that in the prior art, there is no temporary high-temperature-resistant dispersing agent, the present disclosure provides a temporary high-temperature-resistant dispersing agent prepared based on polysiloxane and a preparation and a use method thereof. The temporary high-temperature-resistant dispersing agent has the characteristics of high thermal stability and a low char yield and can play a role of a dispersant in a certain high temperature range; and when the temperature is further increased, a degradation reaction can occur to remove the dispersant from the system and the char yield is low. The temporary high-temperature-resistant dispersing agent has obvious advantages in the dispersion of particles under high temperature conditions. The present disclosure is a block high-molecular polymer prepared by a one-step reaction from an organosilicon compound containing two amino groups. The method is simple and controllable in synthesis condition and high in synthesis efficiency. The block high-molecular polymer synthesized by the present disclosure may be directly used as the dispersant and has a good dispersion effect; the block high-molecular polymer may also be used as a basic formula and used as the dispersant after other auxiliary compositions are added; and a dispersant composition of the present disclosure may also be used in combination with one or more other dispersion auxiliaries and/or surfactants to achieve dispersion of various particular materials.

BRIEF DESCRIPTION OF THE DISCLOSURE

The present disclosure provides a temporary high-temperature-resistant dispersing agent, and a preparation and a use method thereof. The temporary high-temperature-resistant dispersing agent is a block high-molecular polymer prepared by a one-step reaction from an organosilicon compound containing two amino groups. The block high-molecular polymer has the characteristics of high thermal stability and a low char yield and can play a role of a dispersant in a certain high temperature range; and when the temperature is further increased, a degradation reaction can occur to remove the dispersant from the system and the char yield is low, so that the polymer is called the temporary high-temperature-resistant dispersing agent. The block high-molecular polymer may be directly used as the dispersant; the block high-molecular polymer may also be used as a basic formula and used as the dispersant after other auxiliary compositions are added; and the block high-molecular polymer may also be used in combination with one or more other dispersion auxiliaries and/or surfactants to meet dispersion requirements in various special occasions.

DETAIL DESCRIPTION OF THE DISCLOSURE

A technical solution of the present disclosure is as follows:

A preparation of a temporary high-temperature-resistant dispersing agent includes the following steps:

under the condition of using a solvent or not using the solvent, obtaining the temporary high-temperature-resistant dispersing agent through a Mannich reaction by mixing an organosilicon compound containing two amino groups, an aldehyde (ketone) compound and an organic compound containing two phenolic hydroxyl groups. The temporary high-temperature-resistant dispersing agent is a block high-molecular polymer containing siloxy groups, and a reaction formula is as follows:

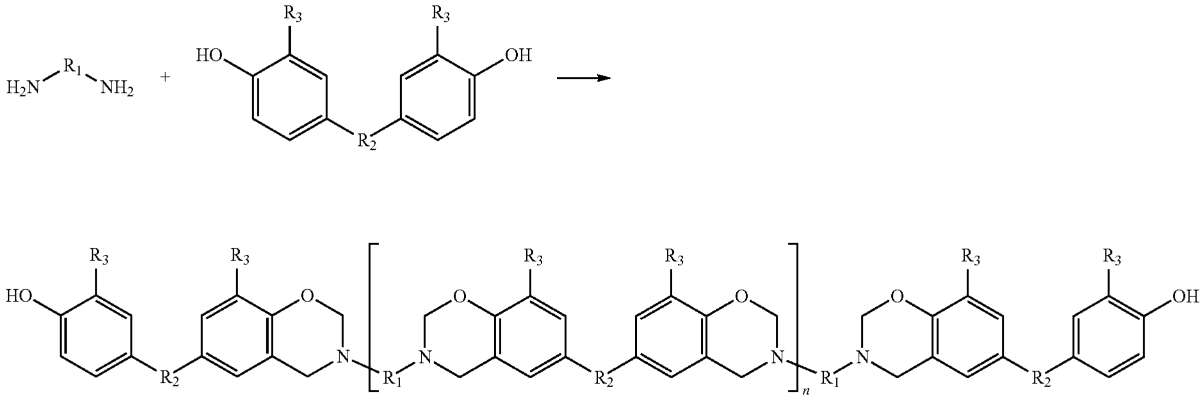

In the formula, $R_1$, $R_2$ and $R_3$ are various aromatic hydrocarbon groups or aliphatic hydrocarbon groups, wherein $R_1$ contains at least one siloxy group, and n=1-100.

According to the present disclosure, preferably, the organosilicon compound containing two amino groups is a compound containing two or more amino groups and one or more siloxy groups in a molecular structure, the organosilicon compound containing two amino groups including: small molecule siloxane containing two or more amino groups, oligosiloxane containing two or more amino groups, polysiloxane containing two or more amino groups, silicone resin containing two or more amino groups, silicone rubber containing two or more amino groups, a block copolymer of siloxane and other polymers containing two or more amino groups, a graft copolymer of siloxane and other polymers containing two or more amino groups, and other compounds, and further preferably, the organosilicon compound containing two amino groups is a polysiloxane compound with two ends of the molecular structure being the amino groups or the small molecule siloxane with two ends of the molecular structure being the amino groups.

According to the present disclosure, preferably, the aldehyde (ketone) compound is various aldehyde (ketone) organic compounds able to be dissolved in a reaction system; further preferably, the aldehyde (ketone) compound is a small molecule aldehyde (ketone) compound; and more preferably, the aldehyde (ketone) compound is formaldehyde, acetone, benzaldehyde, trioxymethylene, paraformaldehyde or cyclohexanone.

According to the present disclosure, preferably, the organic compound containing two phenolic hydroxyl groups is an organic compound whose molecular structure at least contains two phenolic hydroxyl groups that are not on the same benzene ring; further preferably, the organic compound containing two phenolic hydroxyl groups is bisphenol A, dihydroxy diphenyl ether, dihydroxy benzophenone, bisphenol F, bisphenol S, 2,2'-diallyl bisphenol A, dihydroxybiphenyl or bisphenol fluorene; and more preferably, the organic compound containing phenolic hydroxyl groups at two ends is bisphenol fluorene or bisphenol A.

According to the present disclosure, preferably, the solvent is various polar or nonpolar solvents that can dissolve a reactant without having a chemical reaction with the reactant; and further preferably, the solvent is dioxane, toluene, tetrahydrofuran, chloroform, methanol, ethanol, diphenyl ether, dimethyl sulfoxide or N,N-dimethylformamide; and more preferably, the solvent is toluene or chloroform.

According to the present disclosure, preferably, a material molar ratio of the organosilicon compound containing two amino groups to the aldehyde (ketone) compound to the organic compound containing two phenolic hydroxyl groups is 1:(1-20):(1-20), and further preferably, the material molar ratio is 1:(4-15):(1-10).

According to the present disclosure, preferably, a reaction temperature of the organosilicon compound containing two amino groups, the aldehyde (ketone) compound and the organic compound containing two phenolic hydroxyl groups is 30-180° C., and further preferably, the reaction temperature is 40-80° C.

According to the present disclosure, preferably, reaction time of the organosilicon compound containing two amino groups, the aldehyde (ketone) compound and the organic compound containing two phenolic hydroxyl groups is 1-60 h, and further preferably, the reaction temperature is 12-24 h.

According to the present disclosure, a temporary high-temperature-resistant dispersing agent prepared by the above method is further provided.

According to the present disclosure, a use method of the above temporary high-temperature-resistant dispersing agent includes the following steps:

directly serving as a dispersant to be used; or adding a catalyst, a filler and an auxiliary to be used cooperatively; or using in combination with one or more other dispersion auxiliaries and/or surfactants.

When the present disclosure is not specified in detail, the prior art shall apply.

The principle and beneficial effect of the present disclosure are as follows:

A reaction route of the present disclosure cleverly combines the organosilicon compound with good temperature resistance and soft molecular chains with aromatic groups with strong polarity and good temperature resistance, the synergistic effect of the temperature resistance of the two is utilized to realize the high-temperature resistance characteristic of the dispersant, and in particular, the introduction of the aromatic groups reduces the “interchain degradation” and “end group back biting” of a siloxy chain, and further improves the temperature resistance performance. The “temporary” characteristic of the dispersant is realized by using the characteristic that the organosilicon compound has the low residues when being thermally degraded at the higher temperature. Therefore, the block polymer dispersant can act as the dispersant in a certain high temperature range. When the temperature is further increased, a degradation reaction can occur to remove the dispersant from the system, and the char yield is low, which meets the demand for the dispersant in the high temperature environment. The temporary high-temperature-resistant dispersing agent has obvious advantages for the dispersion of the particles under high temperature conditions. Due to good temperature resistance, good dispersion performance and simple post-treatment, remarkable results have been achieved.

The process of the present disclosure consists of a one-step reaction. The reaction can occur without the use of any solvent. The use of the solvent is contributed to improving the blending and reaction efficiency of reaction materials. Considering the aspects such as the polarity, a boiling point, stability and safety of the solvent, toluene and chloroform are preferred. The present disclosure uses the Mannich reaction to combine the organosilicon compound with aromatic structures. In order to improve the conversion rate of products, a feeding ratio of the aldehyde (ketone) compound in this step of reaction needs to be increased appropriately, depending on the type of specific aldehyde compounds. When a formaldehyde solution is used, feeding may be selected; and when trioxymethylene is used, 2-fold feeding may be selected.

The block polymer dispersant synthesized by the present disclosure may be used as a dispersant directly or may be used as the dispersant after being mixed with other substances. A variety of additives (including various fillers and auxiliaries, etc.) are used to be mixed with the dispersant, and the overall performance of the dispersant may be greatly improved, so that the dispersant meets the dispersion requirements of various occasions, and has wide application prospects and good market prospects.

DETAILED DESCRIPTION OF THE EMBODIMENTS

The present disclosure is further explained by specific embodiments below, but is not limited to this.

Raw materials used in the embodiments are all conventional commercially purchased raw materials or obtained through synthesis according to methods in references.

A molar ratio in the embodiments is a proportion of the amount of substances and a proportion of parts is a mass proportion.

Embodiment 1

Aminopropyl-terminated disiloxane, bisphenol fluorene and trioxymethylene are evenly mixed in toluene according to a molar ratio of 1:1.5:4, kept at 80° C., and mechanically stirred for 6 hours to obtain a block polymer dispersant containing fluorenyl. The yield of the block polymer dispersant containing fluorenyl is 85%.

Embodiment 2

As described in Embodiment 1, the differences are that the aminopropyl-terminated disiloxane is changed to aminopropyl-terminated polysiloxane (number-average molecular weight is 5000), the trioxymethylene is changed to a formaldehyde aqueous solution (the concentration of formaldehyde aqueous solution is 37 wt %), and the molar ratio is changed to 1:1:6. The reaction temperature is changed to 70° C., mechanical stirring is performed for 12 hours, and a block polymer dispersant containing fluorenyl is obtained, the reaction yield of the block polymer dispersant containing fluorenyl is 97%.

Figure 1:
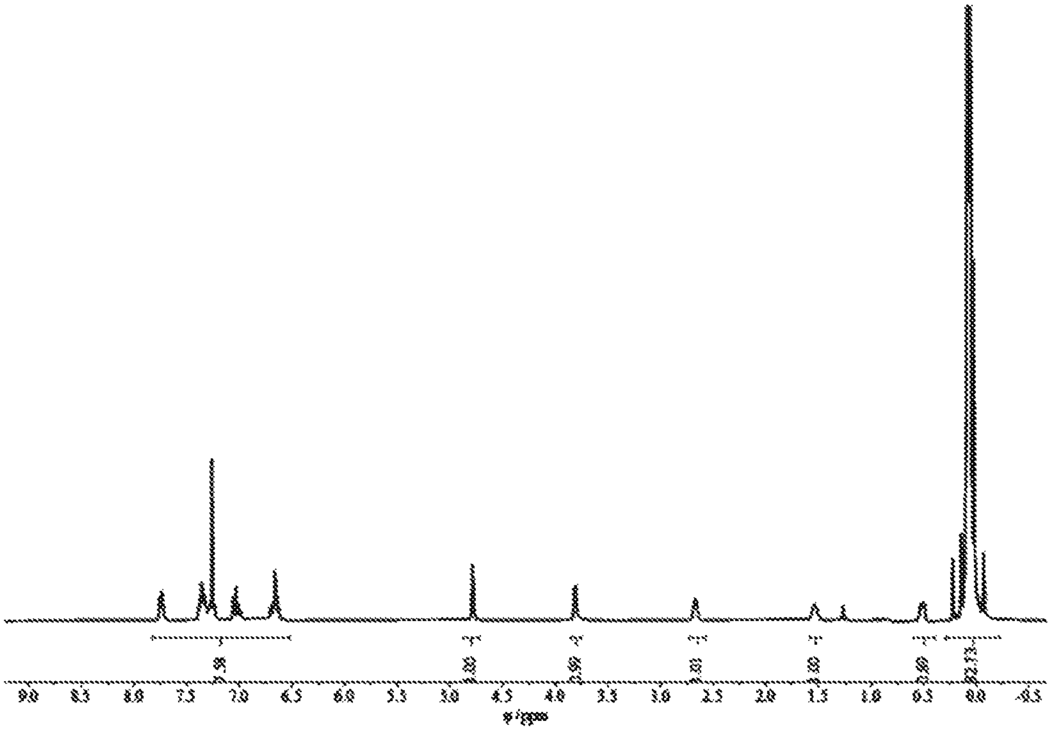
FIG. 1 is a nuclear magnetic spectrogram of a block polymer dispersant containing fluorenyl obtained by Embodiment 2.

Hydrogen nuclear magnetic resonance of the block polymer dispersant synthesized in the embodiment is as shown in FIG. 1, $^1$H NMR ($CDCl_3$): δ=0.05 ppm is the peak location of hydrogen in silylmethyl ($SiCH_3$) in siloxane, δ=0.51 ppm is the peak location of the first methylene ($SiCH_2CH_2CH_2N$) connected to silicon, δ=1.53 ppm is the peak location of the second methylene ($SiCH_2CH_2CH_2N$) connected to silicon, δ=2.66 ppm is the peak location of the third methylene ($SiCH_2CH_2CH_2N$) connected to silicon, δ=3.74 ppm is the peak location of Ar—$CH_2$—N, δ=4.74 ppm is the peak position of O—$CH_2$—N, and δ between 6.65-7.76 ppm is the peak position of hydrogen on a benzene ring (Ar—H).

Figure 2:
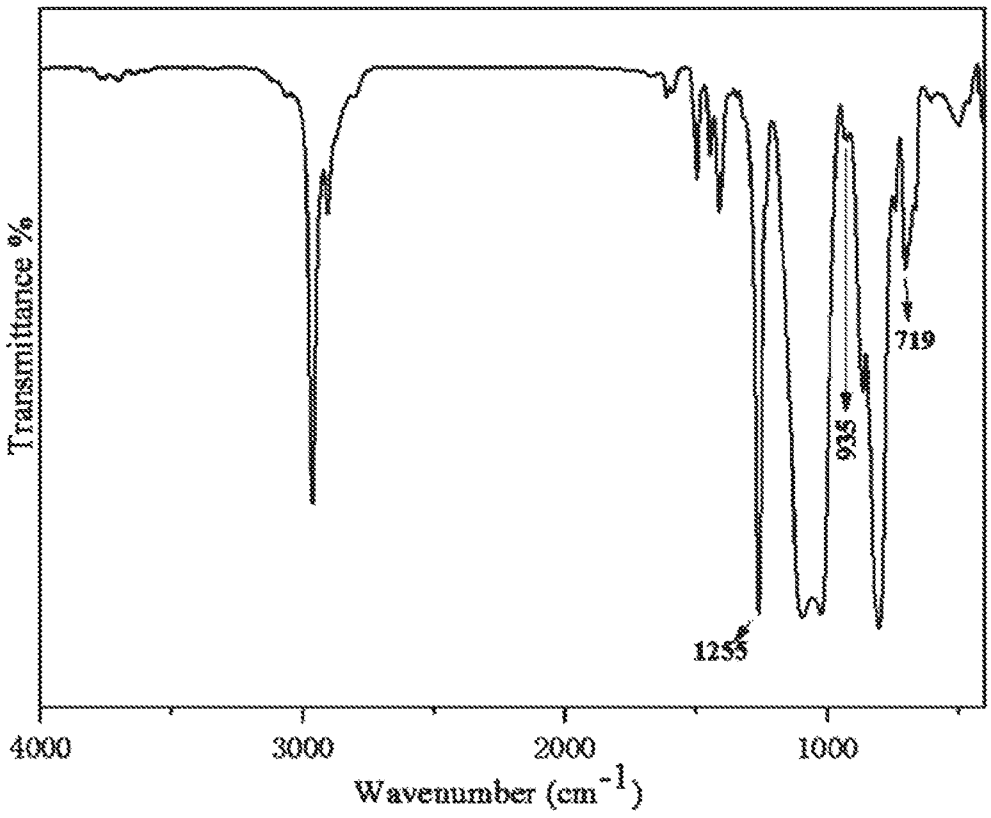
FIG. 2 is an infrared spectrogram of a block polymer dispersant containing fluorenyl obtained by Embodiment 2.

An infrared representation of the block polymer dispersant synthesized in the embodiment is as shown in FIG. 2. It can be seen from FIG. 2 that peaks of 1055 $cm^{-1}$ and 1022 $cm^{-1}$ are generated by asymmetric bending vibration of Si—O—Si in polysiloxane. 1261 $cm^{-1}$ and 1183 $cm^{-1}$ are asymmetric stretching vibration peaks of C—O—C and C—N—C on an oxazine ring respectively. 935 $cm^{-1}$ is a characteristic absorption peak of a benzene ring connected with the oxazine ring, that is, the characteristic absorption peak of the oxazine ring, indicating that benzoxazine has been generated; and similarly, there are also peaks at 1495 $cm^{-1}$ and 719 $cm^{-1}$, indicating that the 1,2,4 triple substituted peaks of the benzene ring has been generated, which further explains the generation of the oxazine ring.

Figure 3:
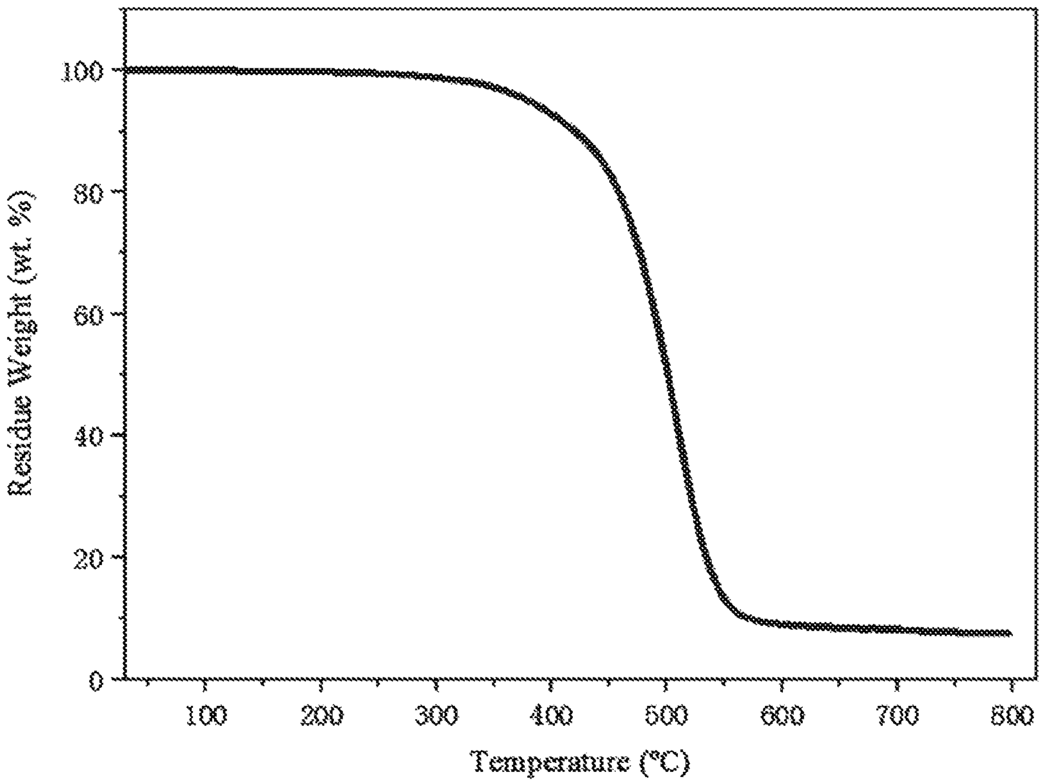
FIG. 3 is a TGA diagram of a block polymer dispersant containing fluorenyl obtained by Embodiment 2.

TGA test results of the block polymer dispersant synthesized in the embodiment are as shown in FIG. 3: it can be seen from FIG. 3 that the temperature of a 5% thermal weight loss is 325° C., and the char yield at 600° C. is only 7%. It indicates that the substance is still stable when heated to 300° C., but almost no longer exists when heated to 600° C., that is, the substance may be removed by heating.

A reaction process of the block polymer dispersant obtained in the embodiment is as follows:

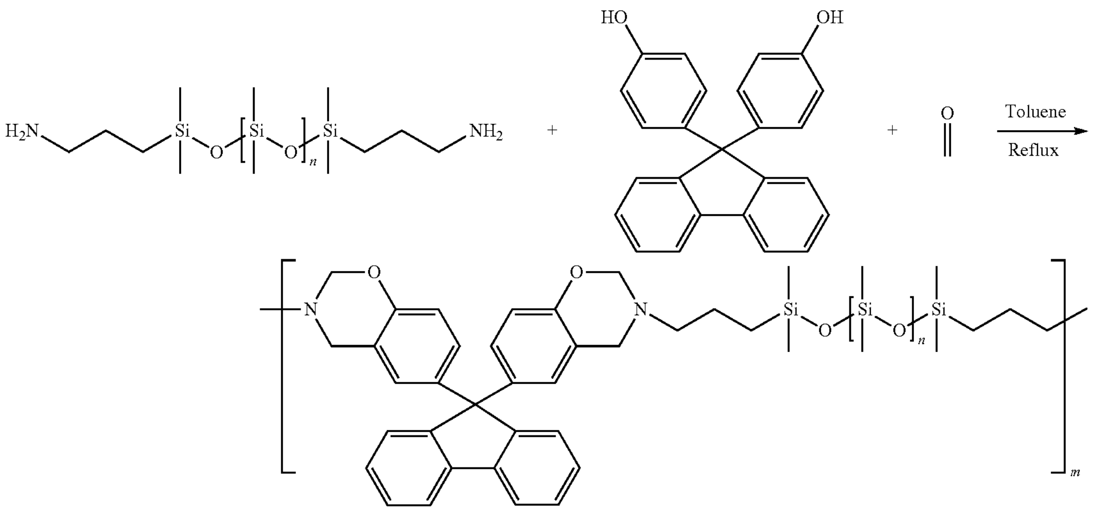

Embodiment 3

As described in Embodiment 2, the difference is that the bisphenol fluorene is changed to bisphenol A, other parameters are the same, and a block polymer dispersant containing a bisphenol A structure is obtained, the reaction yield of the block polymer dispersant containing a bisphenol A structure is 100%.

Embodiment 4

As described in Embodiment 2, the difference is that the bisphenol fluorene is changed to bisphenol S, and a block polymer dispersant containing bisphenol S is finally obtained, the reaction yield of the block polymer dispersant containing bisphenol S reaching 100%.

Embodiment 5

As described in Embodiment 2, the difference is that the bisphenol fluorene is changed to 2,2'-diallyl bisphenol A. A block polymer dispersant containing bisphenol A is finally obtained, and the reaction yield of the block polymer dispersant containing bisphenol A reaches 90%.

Embodiment 6

As described in Embodiment 2, the difference is that the aminopropyl-terminated polysiloxane (number-average molecular weight is 5000) is changed to aminopropyl-terminated polysiloxane (number-average molecular weight is 10000), a product is a block polymer dispersant containing fluorenyl benzoxazine, and the reaction yield of the block polymer dispersant containing fluorenyl benzoxazine reaches 96%.

Embodiment 7

As described in Embodiment 6, the difference is that the bisphenol fluorene is changed to bisphenol S, a product is a block polymer dispersant containing bisphenol S, and the reaction yield of the block polymer dispersant containing bisphenol S is 96%.

Embodiment 8

As described in Embodiment 6, the difference is that the bisphenol fluorene is changed to 2,2'-diallyl bisphenol A, and a solvent is changed to chloroform. A product is a block polymer dispersant containing fluorenyl, and the reaction yield of the block polymer dispersant containing fluorenyl is 93%.

Embodiment 9

As described in Embodiment 8, the difference is that a formaldehyde aqueous solution is changed to paraformaldehyde, and a solvent is changed to tetrahydrofuran. A product is a block polymer dispersant containing fluorenyl, and the reaction yield of the block polymer dispersant containing fluorenyl is 96%.

Embodiment 10

As described in Embodiment 2, the difference is that acetic acid is added to serve as a catalyst of a reaction, the adding amount is 5% of the amount of substance of the aminopropyl-terminated polysiloxane, and reaction time is 3 hours. A product is a block polymer dispersant containing fluorenyl, and the reaction yield of the block polymer dispersant containing fluorenyl is 94%.

Embodiment 11

The block polymer dispersant containing fluorenyl obtained in Embodiment 2 is used as a basic formula (100 parts), methylsilicone oil (10 parts) with the type of 201 is added for compounding, and uniform mixing is performed. Then, temperature resistance performance of the dispersant is determined.

Embodiment 12

The block polymer dispersant obtained in Embodiment 6 is used as a basic formula (100 parts), 10 parts of high temperature conduction oil are added, and uniform mixing is performed. Then, temperature resistance performance of the dispersant is determined.

Test Example 1

The heat resistance of the dispersants in Embodiments 2, 3, 11 and 12 is tested. The dispersibility is determined in accordance with the industry standard HG/T2499-2006, and results are as shown in Table 1.

TABLE 1

| Embodiments | Experimental time | Experimental temperature | Sample appearance | Dispersibility (of standard substances) % |
|---|---|---|---|---|
| Embodiment 2 | 2 h | 280 °C | Pale yellow oiliness | 120 |
| Embodiment 3 | 1.8 h | 290 °C | Pale yellow oiliness | 118 |
| Embodiment 11 | 2.5 h | 300 °C | Pale yellow oiliness | 106 |

TABLE 1-continued

| Embodiments | Experimental time | Experimental temperature | Sample appearance | Dispersibility (of standard substances) % |
|---|---|---|---|---|
| Embodiment 12 | 2.3 h | 275 °C | Pale yellow oiliness | 109 |

It can be seen from Table 1 that the block polymer dispersant prepared in the present disclosure may be used as a dispersant itself and has high-temperature resistance. When such dispersant is mixed with other auxiliaries for compounding, the performance is still very good, and the overall temperature resistance performance is even higher than temperature resistance data of a high-temperature resistant dispersant reported in the references. The data show that the dispersant of the present disclosure has obvious superiority in temperature resistance performance. In combination with the above-mentioned advantages of the present disclosure in preparation process, the creativity of the present disclosure is further demonstrated.

It can be seen from FIG. 3 that a 5% thermal weight loss of the block polymer dispersant in Embodiment 2 is at 380° C., and a 10% thermal weight loss is at 450° C. This indicates that the dispersant may be used at the temperature below 450° C. and has good temperature resistance. It can also be seen from FIG. 3 that when the temperature rises to be above 450° C., the block polymer dispersant begins to decompose rapidly. When the temperature rises to 550° C., the mass of residual char of the block polymer dispersant is about 10%, showing good "temporary" performance.

What is claimed is:

1. A preparation method of a temporary dispersing agent with a temperature resistance up to 300° C., comprising the following steps:

under the condition of using a solvent or not using the solvent, obtaining the temporary dispersing agent with a temperature resistance up to 300° C. through a Mannich reaction by mixing an organosilicon compound containing two amino groups, an aldehyde/ketone compound and an organic compound containing two phenolic hydroxyl groups;

the organosilicon compound containing two amino groups is a compound containing two or more amino groups and one or more siloxy groups in a molecular structure;

the organic compound containing two phenolic hydroxyl groups is an organic compound whose molecular structure at least contains two phenolic hydroxyl groups that are not on the same benzene ring;

a material molar ratio of the organosilicon compound containing two amino groups to the aldehyde/ketone compound to the organic compound containing two phenolic hydroxyl groups is 1:(6-20):(1-20).

2. The preparation method of the temporary dispersing agent with a temperature resistance up to 300° C. according to claim 1, wherein the organosilicon compound containing two amino groups is small molecule siloxane containing two or more amino groups in the molecular structure, oligosiloxane containing two or more amino groups in the molecular structure, polysiloxane containing two or more amino groups in the molecular structure, silicone resin containing two or more amino groups in the molecular structure, silicone rubber containing two or more amino groups in the molecular structure, a block copolymer of siloxane and other polymers containing two or more amino groups in the molecular structure or a graft copolymer of siloxane and other polymers containing two or more amino groups in the molecular structure.

3. The preparation method of the temporary dispersing agent with a temperature resistance up to 300° C. according to claim 1, wherein the aldehyde/ketone molecule compound is a small aldehyde/ketone compound able to be dissolved in a reaction system.

4. The preparation method of the temporary dispersing agent with a temperature resistance up to 300° C. according to claim 3, wherein the aldehyde/ketone compound is formaldehyde, acetone, benzaldehyde, trioxymethylene, paraformaldehyde or cyclohexanone.

5. The preparation method of the temporary dispersing agent with a temperature resistance up to 300° C. according to claim 1, wherein the organic compound containing two phenolic hydroxyl groups is bisphenol A, dihydroxy diphenyl ether, dihydroxy benzophenone, bisphenol F, bisphenol S, 2,2'-diallyl bisphenol A, dihydroxybiphenyl or bisphenol fluorene.

6. The preparation method of the temporary dispersing agent with a temperature resistance up to 300° C. according to claim 1, wherein the solvent is one of various polar or nonpolar solvents that are able to dissolve a reactant without having a chemical reaction with the reactant.

7. The preparation method of the temporary dispersing agent with a temperature resistance up to 300° C. according to claim 6, wherein the solvent is selected from dioxane, toluene, tetrahydrofuran, chloroform, methanol, ethanol, diphenyl ether, dimethyl sulfoxide, N,N-dimethylformamide or a combination thereof.

8. The preparation method of the temporary dispersing agent with a temperature resistance up to 300° C. according to claim 1, wherein a material molar ratio of the organosilicon compound containing two amino groups to the aldehyde/ketone compound to the organic compound containing two phenolic hydroxyl groups is 1:(6-15):(1-10).

9. The preparation method of the temporary dispersing agent with a temperature resistance up to 300° C. according to claim 1, wherein a reaction temperature of the organosilicon compound containing two amino groups, the aldehyde/ketone compound and the organic compound containing two phenolic hydroxyl groups is 30-180° C.

10. The preparation method of the temporary dispersing agent with a temperature resistance up to 300° C. according to claim 9, wherein a reaction temperature of the organosilicon compound containing two amino groups, the aldehyde/ketone compound and the organic compound containing two phenolic hydroxyl groups is 40-80° C.

11. The preparation method of the temporary dispersing agent with a temperature resistance up to 300° C. according to claim 1, wherein reaction time of the organosilicon compound containing two amino groups, the aldehyde/ketone compound and the organic compound containing two phenolic hydroxyl groups is 1-60 h.

12. The preparation method of the temporary dispersing agent with a temperature resistance up to 300° C. according to claim 11, wherein reaction time of the organosilicon compound containing two amino groups, the aldehyde/ketone compound and the organic compound containing two phenolic hydroxyl groups is 12-24 h.

13. A method of using the temporary dispersing agent with a temperature resistance up to 300° C. prepared by the method according to claim 1, comprising the following steps:

adding a catalyst, a filler and an auxiliary for cooperative use with the temporary high-temperature-resistant dispersing agent, the auxiliary is methylsilicone oil or high temperature conduction oil.

14. A method of using the temporary dispersing agent with a temperature resistance up to 300° C. prepared by the method according to claim 1, comprising the following steps:

using the temporary high-temperature-resistant dispersing agent in combination with one or more other dispersion auxiliaries and/or surfactants.

* * * * *